United States Patent [19]

Brown

[11] 4,246,834
[45] Jan. 27, 1981

[54] PATTY BROILER

[75] Inventor: John S. Brown, Half Moon Bay, Calif.

[73] Assignee: NPI Corporation, Burlingame, Calif.

[21] Appl. No.: 58,087

[22] Filed: Jul. 16, 1979

[51] Int. Cl.³ .............................................. A47J 37/06
[52] U.S. Cl. ......................................... 99/334; 99/386
[58] Field of Search ................. 99/386, 326, 327, 334, 99/335, 338, 337

[56] References Cited

U.S. PATENT DOCUMENTS

| | | | |
|---|---|---|---|
| 1,555,336 | 9/1925 | Vaughan | 99/386 |
| 1,963,924 | 6/1934 | Smith | 99/334 |
| 2,447,641 | 8/1948 | Dunham | 99/334 |
| 3,487,770 | 1/1970 | Svensson | 99/337 |

FOREIGN PATENT DOCUMENTS 952685  2/1963  United Kingdom ...................... 99/386

Primary Examiner—Billy J. Wilhite
Attorney, Agent, or Firm—Lothrop & West

[57] ABSTRACT

A substantially enclosed and insulated frame has a chain conveyor for carrying patties from one end of the frame to the other. A motor on the frame operates the chain conveyor. A heating element on the frame is effective to increase the temperature within the enclosure and is in position to heat a patty on the conveyor. A thermostat on the frame within the enclosure is subject to such temperature and is effective through a controller to vary the speed of the conveyor in relation to the temperature of the thermostat. Preferably, the speed of advance of the conveyor is increased as the enclosure temperature increases and vice versa. A manual controller permits variation in the ratio of the sensed temperature and the speed of the conveyor.

1 Claim, 1 Drawing Figure

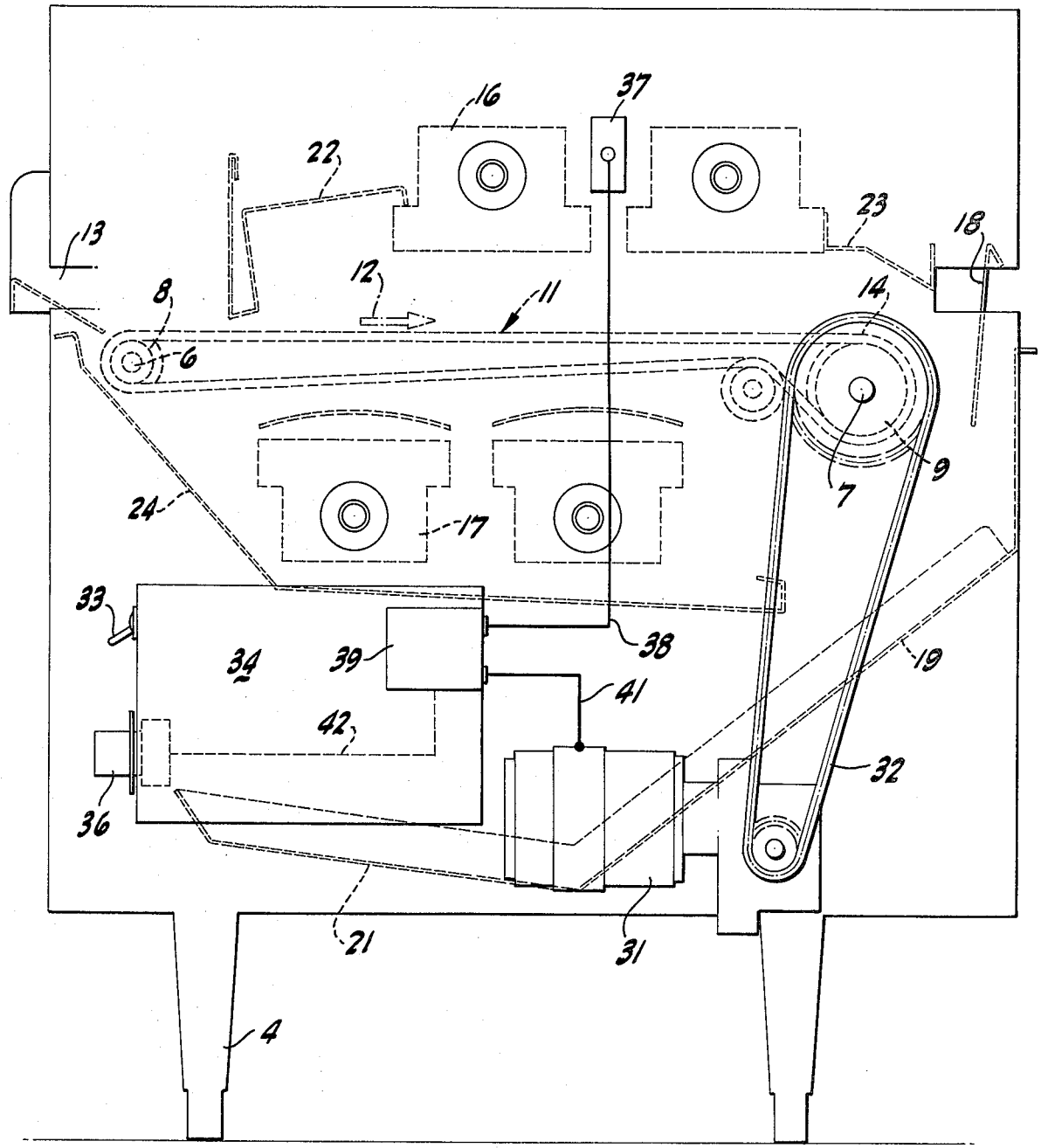

PATTY BROILER

BRIEF SUMMARY OF THE INVENTION

Patties are customarily grilled while being transported on a conveyor across a substantially enclosed frame. The patties are heated and cooked by at least one heating element on the frame also effective to increase the temperature within the substantially enclosed frame. To assist in controlling the cooking of the patty, there is provided a thermostat subject to the temperature within the substantially enclosed frame and effective to vary or control the speed of the motor which drives the conveyor. Preferably, the relationship between the thermostat temperature and the motor speed is subject to variation.

BRIEF DESCRIPTION OF THE DRAWING

The drawing is a schematic showing, generally in cross-section on a vertical, longitudinal plane, of a patty broiler having therein a thermostat and attendant mechanism for controlling the motor which drives the patty conveyor.

DETAILED DESCRIPTION

In accordance with the invention, there is provided a frame 4 which generally is completely enclosed except for appropriate access openings and is usually insulated so as to constitute and isolated volume that can be maintained at an elevated temperature. On the frame a couple of cross shafts 6 and 7 are mounted. These carry sprockets 8 and 9 around which a conveyor 11 is adapted to operate, preferably with the upper run of the conveyor advancing in the direction of the arrow 12 from a feeding opening 13 to a conveyor discharge end 14.

Disposed both below and above the conveyor 11 are heater elements such as 16 and 17. These are related to the conveyor in such a fashion that a patty advancing thereon is subjected to increased temperature and cooking. That is, a raw patty, usually frozen, introduced through the opening 13 onto the conveyor is thawed and cooked as it travels across the frame on the conveyor 11. The cooked patty is discharged at the end 14 and falls by gravity. The discharge is preferably against a deflector 18 and onto an inclined discharge tray 19 which has a storage portion 21 situated where an attendant may withdraw the cooked patty.

To assist in conserving heat, the interior of the largely enclosed, insulated frame is provided with heat reflectors and deflectors such as 22, 23 and 24 so that well within the device the atmospheric temperature can readily and economically be raised and maintained at an elevated value.

The conveyor 11 is driven in the indicated direction by an electric motor 31 on the frame and having a drive chain 32 effective on the shaft 7, so that the speed of the conveyor 11 is a direct function of the speed of the motor 31. The motor 31 is subject to control by a main switch 33 on a control box 34 on the frame and is also provided with a rheostat 36 so that the user may set the motor and conveyor speed at a desired value.

In the present instance, the mechanism is subject to additional control in order to coordinate the speed of the motor and of the conveyor with temperature in the vicinity of the cooking zone of the device. For that reason, a thermostat 37 is disposed near the burners 16, preferably above the conveyor 11, and in a vicinity to be generally affected by the cooking temperatures or the resulting temperature of the air in the vicinity of the upper run of the conveyor on which the patty is cooked. The thermostat is far enough along the travel of the conveyor so that the initially frozen patty has warmed to and is approaching or is actually in or has attained a cooking or broiling temperature.

The thermostat 37, being responsive to the cooking temperatures, is connected through a conductor 38 into a junction box 39 in the controller 34 and is connected through a conductor 41 to the motor 31. The detailed electrical connections of the parts are not illustrated since they are well understood, but the conductors 38 and 41 are illustrated to show the functional connection of the parts. Preferably, and in this instance, the manual rheostat 36 has a conductor 42 going to the control box 39.

As a result of this structure, the thermostat 37 is influential over and controls the speed of the motor 31 and advance of the conveyor 11. For example, when the temperature affecting the thermostat 37 is relatively high, indicating a rapid cooking rate for the patty, then the speed of the motor 31 is likewise increased so that the patty is speeded up sufficiently to take on only a substantially standard cooked condition rather than becoming overcooked due to excessive length of exposure to the higher temperature. Conversely, when starting or when the temperature within the volume is relatively low and the thermostat 37 has a relatively low temperature, the motor 31 correspondingly is operated at a slow speed. That patty on the conveyor 11 then advances slowly and eventually and automatically arrives at the discharge location in a substantially standard cooked condition.

The standard cooked condition can be readily varied to suit the operator by turning the rheostat 36 to change the ratio between the thermostat temperature and the motor speed. In this way, the desired, standard cooked condition of the product is easily and consistently arrived at.

I claim:

1. A patty broiler comprising a substantially enclosed frame, a conveyor, means for mounting said conveyor on said frame to move across said frame, a motor on said frame for operating said conveyor, a pair of heating elements arranged side by side on said frame above the central portion of the length of said conveyor in position to heat a patty on said conveyor and to increase the temperature within said substantially enclosed frame, a thermostat on said frame between said heating elements and above the central portion of the length of said conveyor subject to said temperature, and means for connecting said thermostat to control the speed of said motor.

* * * * *